Patented Aug. 7, 1951

2,563,004

UNITED STATES PATENT OFFICE 2,563,004

ORGANOSILICON MATERIALS CONTAINING THE REPEATING STRUCTURE —SiSiC—

Harold A. Clark, Midland, Mich., assignor to Dow Corning Corporation, Midland, Mich., a corporation of Michigan No Drawing. Application June 15, 1949, Serial No. 99,335

4 Claims. (Cl. 260—2)

The present invention relates to the production of new organosilicon compositions and in particular to the reaction of dichlorodisilmethylene compounds with sodium to produce organosilicon compositions having the repeating structure —SiSiC—.

The present organosilicon industry is based upon siloxanes which are materials in which the silicon atoms are linked through oxygen atoms. Another type of silicon compound is one in which the silicon atoms are linked directly to each other. Still a third type is one in which the silicon atoms are linked by organic radicals. The present invention is concerned with compositions which contain both polysilane bonding and methylene linkage between silicon atoms.

The compositions of the present invention have the formula $[-SiR_2SiR_2CH_2-]_n$ where each R is a hydrocarbon radical of the group consisting of alkyl radicals, such as methyl to octadecyl, and monocyclicaryl radicals, such as phenyl, tolyl and xylyl, and each $n$ is an integer having a value of at least two.

In accordance with the present invention the production of these compositions in the case of $[-Si(CH_3)_2Si(CH_3)_2CH_2-]_n$ is effected by reacting an alkali metal with the compound, $Cl(CH_3)_2SiCH_2Si(CH_3)_2Cl$. This reaction is effected by contacting the two with the said compound in liquid phase.

Any alkali metal may be utilized effectively in the present process, though sodium and potassium are preferred due to their commercial availability. The alkali metal is employed in amount at least equivalent to the chlorine present in the dichlorodisilmethylene reactant. The alkali metal should be in a finely divided state in order to promote the production of a high yield. To assist in securing fine division a diluent may be used. The alkali metal may be either finely divided, suspended, solid alkali metal or finely divided, molten alkali metal. If desired, the eutectic alloy of sodium and potassium may be employed.

The dichlorodisilmethylene compound may be added to the finely divided alkali metal suspended in an inert liquid diluent boiling above the melting point of the alkali metal at the operating pressure, such as xylene. Another specific mode of employment of the present invention is to add the finely divided solid, suspended alkali metal to the dichlorodisilmethylene compound. After the reaction is complete, the product may be filtered and washed to remove any traces of alkali metal or alkali metal chloride.

The product where R represents methyl is a very slippery, high viscosity, high molecular weight oil. Needle-like crystals may be isolated from the oil. The crystalline product is the cyclic dimer $(R_2SiCH_2SiR_2)_2$, while the remainder of the product is a high molecular weight polymer of the formula $[-SiR_2SiR_2CH_2-]_n$, where $n$ has an undeterminable high value, since these are high polymers.

The crystalline dimers hereof are of utility as intermediates in the preparation of other organosilicon compositions. The high polymer fluids hereof are of utility for such purposes as hydrophobing agents, lubricants, hydraulic fluids, and heat transfer media. The polymers where R represents a higher alkyl are wax-like in character and may be employed as polishes.

The following examples illustrate the method of the present invention.

Example 1

Sodium in amount of 28 parts by weight was added gradually to 174.4 parts of xylene and heated to reflux. $(CH_3)_2ClSiCH_2Si(CH_3)_2Cl$ in amount of 110 parts was then gradually added to the solution. Five parts of $CH_2Cl_2$ were then added. The fluid product was centrifuged to separate the insoluble salt, and the salt was washed with xylene. The solvent was next stripped from the product. The product was a very slippery, high viscosity oil. Needle-like crystals were obtained as a deposit from the oil and from a distillation of the filtrate. The crystalline material boiled at 85° C. at 3 mm. and has a melting point of 42° C. It was determined by analysis that this was the dimer $$[-Si(CH_3)_2Si(CH_3)_2CH_2-]_2$$

The remainder of the product was a non-volatile, higher molecular weight polymer of the type $$[-Si(CH_3)_2Si(CH_3)_2CH_2-]_n$$

This fluid is of utility both for indirect heat transfer and as a lubricant.

Example 2

A mixture of 100 parts of $$(CH_3)_2ClSiCH_2SiCl_2CH_3$$

and 58 parts of chlorobenzene was added gradually to 50 parts of molten sodium in 259.8 parts of toluene. The addition was at a rate sufficient to maintain reflux. After 1 hour of stirring, 12 parts of additional chlorobenzene were added. The solvent was then stripped from the product. The chlorobenzene and sodium caused substitution of phenyl for one of the two chlorines on the silicon and caused condensation to form parts of a polymer of the general formula

[—Si(CH₃)₂SiCH₃C₆H₅CH₂—]ₙ where $n$ has an extremely high value as is characteristic of high polymers. These polymers have a very rubbery character and are soluble in non-polar solvents.

That which is claimed is:
1. Compositions of the general formula

[—SiR₂SiR₂CH₂—]ₙ in which each R represents a radical of the group consisting of alkyl and monocyclicaryl radicals and $n$ is an integer having a value of at least two.
2. Compositions in accordance with claim 1 where each R represents a methyl radical.
3. Compositions in accordance with claim 1 in which some R's are alkyl radicals and some are monocyclicaryls, and which compositions contain both alkyl and monocyclicaryl radicals.
4. [—Si(CH₃)₂Si(CH₃)₂CH₂—]₂.

HAROLD A. CLARK.

REFERENCES CITED

The following references are of record in the file of this patent:

UNITED STATES PATENTS

| Number | Name | Date |
|---|---|---|
| 2,483,972 | Goodwin | Oct. 14, 1949 |
| 2,491,833 | Sauer | Dec. 20, 1949 |